United States Patent [19]

Ohtsu et al.

[11] Patent Number: 5,332,794

[45] Date of Patent: Jul. 26, 1994

[54] PROCESS OF PREPARING BUTADIENE-STYRENE COPOLYMER WITH NICKEL COMPOUND AND ALKYLALUMINOXANE COMPOUND CATALYSTS

[75] Inventors: Takayuki Ohtsu, Nara; Kiyoshi Endo, Osaka, both of Japan

[73] Assignee: Bridgestone Corporation, Tokyo, Japan

[21] Appl. No.: 47,455

[22] Filed: Apr. 19, 1993

[30] Foreign Application Priority Data

Apr. 20, 1992 [JP] Japan .................................. 4-099917

[51] Int. Cl.⁵ ........................ C08F 4/52; C08F 236/10
[52] U.S. Cl. .................... 526/169.1; 526/160; 526/161; 526/165; 526/340; 502/117
[58] Field of Search .............. 526/93, 161, 165, 169.1, 526/340, 160

[56] References Cited

U.S. PATENT DOCUMENTS

| | | |
|---|---|---|
| 3,170,904 | 2/1965 | Ueda et al. |
| 3,639,520 | 2/1972 | Onishi et al. |
| 3,640,989 | 2/1972 | Throckmorton ................. 526/169.1 |
| 4,054,612 | 10/1977 | Yagi et al. ..................... 526/169.1 X |

FOREIGN PATENT DOCUMENTS 1249527 9/1967 Fed. Rep. of Germany ... 526/169.1

OTHER PUBLICATIONS

Kogyo Kagaku Zasshi, 72:2081 (1969).

*Primary Examiner*—Fred Teskin
*Attorney, Agent, or Firm*—Sughrue, Mion, Zinn, Macpeak & Seas

[57] ABSTRACT

A process is provided for preparing butadiene-styrene copolymers having cis-1,4 configuration of at least 80% of butadiene units, bound styrene contents of 2 to 55% and no homopolystyrene. The copolymers are prepared with a new catalyst system having high polymerization activity. The process involves carrying out polymerization of butadiene monomer and styrene monomer in the presence of the new catalyst system which is comprised of a nickel compound and an alkylaluminoxane compound.

11 Claims, No Drawings

5,332,794

PROCESS OF PREPARING BUTADIENE-STYRENE COPOLYMER WITH NICKEL COMPOUND AND ALKYLALUMINOXANE COMPOUND CATALYSTS

BACKGROUND OF THE INVENTION

1. Field of the Invention

The present invention relates to a novel process for copolymerizing butadiene and styrene and to a process for preparing improved butadiene-styrene copolymers having a high cis-1,4 configuration of the butadiene units.

2. Description of the Related Art

High cis-1,4 polybutadiene rubber has many excellent properties such as high resilience, low heat-built-up and abrasion resistance, and is therefore used for tires.

However, this rubber tends to have undesirable processing characteristics such as poor banding on a roll mill, which therefore necessitates a multiplation mixing stage. Further, the rubber has poor tear resistance, which results in chipping or cutting of the rubber.

A butadiene-styrene copolymer, which has a high cis-1,4 configuration of the butadiene units and the suitable contents of styrene, may be the most desirable polymer to solve these drawbacks without adversely affecting the above-described excellent characteristic properties of cis-1,4 polybutadiene.

Further, it has been known in the prior art that polybutadienes having a high cis-1,4 configuration of the butadiene units can be produced with high activity catalysts such as a three-component catalyst system comprising a nickel compound, a Lewis acid and an organo aluminum compound, as described in U.S. Pat. No. 3,170,904 and others.

The copolymerization of butadiene and styrene was carried out with an aforementioned three-component catalyst having acetylacetone nickel compound as the nickel compound, titanium tetrachloride as the Lewis acid and triethylaluminum as the organo aluminum compound, as described above (U.S. Pat. No. 3,639,520 and Kogyo Kagaku Zasshi, Vol.72, p. 2081 (1969)).

In this case, the polymerization activity of the catalyst system becomes markedly lower. Further, resultant copolymers have a high cis-1,4 configuration of the butadiene units and have a very low content of bound styrene of the copolymer. As the resultant copolymers contain homopolystyrene, the desirable properties of the copolymer deteriorate.

Further, there are processes, which are well-known in the industry, for producing butadiene-styrene copolymers.

Main catalyst systems in such processes are as follows: an alkyllithium compound system and a radical type catalyst system. Further, in the well-known processes mentioned above, the cis-1,4 configuration of the butadiene units of the copolymer is less than or equal to about 60%.

SUMMARY OF THE INVENTION

An object of the present invention is to provide butadiene-styrene copolymers having a cis-1,4 configuration of at least 80% of the butadiene units, bound styrene contents of 2 to 55%, and no homopolystyrene.

Another object of the present invention is to provide a process for producing the copolymers described above by copolymerization using a new catalyst system having high polymerization activity.

The process involves carrying out polymerization of butadiene monomer and styrene monomer in the presence of a catalyst, wherein the catalyst comprises of (A) a nickel compound and (B) an alkylaluminoxane compound, wherein the amount of the nickel compound is 0.001 to 10 mmole per 100 g of total monomers charged, and further, the molar ratio of aluminum in the alkylaluminoxane compound to nickel in the nickel compound is 1 to about $1 \times 10^5$, wherein the alkylaluminoxane compound is represented by any one of the following formulas (I), (II) and (III):

| | | |
|---|---|---|
| $R^1[Al(R^2)O]_nAl(R^3,R^4)$ | (linear structure) | (I) |
| $[Al(R^5)O]_m$ | (cyclic structure) | (II) |
| mixtures of (I) and (II) | | (III) | wherein $R^1$, $R^2$, $R^3$, $R^4$ and $R^5$ are selected from alkyls having from 1 to about 10 carbon atoms, n is an integer from 1 to about 100, and m is an integer from 2 to about 50.

DETAILED DESCRIPTION OF THE INVENTION

The butadiene-styrene copolymers of the present invention are prepared by copolymerization using a catalyst system containing a nickel compound as the (A) component and an alkylaluminoxane compound as the (B) component.

The nickel compound of the catalyst system includes a nickel salt of an organic carboxylic acid and an organic complex compound of nickel.

The nickel salt of an organic carboxylic acid has the following formula:

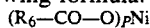

wherein $R^6$ is selected from the group consisting of aliphatic-, alicyclic- and aromatic-hydrocarbon and p is the valence of nickel.

These salts are, for example, nickel formate, nickel acetate, nickel ethylhexoate, nickel isooctenate, nickel palmitate, nickel stearate, nickel benzoate, nickel methylbenzoate, nickel cyclohexylcarboxylate and nickel naphthenate.

The organic complex compound of nickel is a carbonyl nickel complex such as tetracarbonyl nickel, a hydroxyaldehyde nickel complex such as salicylaldehyde nickel or salicylaldehydeimine nickel, a hydroxyketone nickel complex such as acetylacetone nickel, a hydroxyester nickel complex such as acetaceticethylester nickel, a diketonedioximo nickel complex such as bis (dimethylglyoximo) nickel, an 8-hydroxyquinoline nickel complex such as 8-hydroxyquinoline nickel or a π-cyclopentadienyl nickel complex such as π-cyclopentadienyl nickel.

It is preferable to use nickel formate, nickel naphthenate, nickel stearate, nickel benzoate, acetylacetone nickel, acetaceticethylester nickel, salicylaldehyde nickel or salicylaldehydeimine nickel.

It should be noted with regard to the alkylaluminoxane compound that the structure may basically be either a linear polymer structure or a cyclic polymer structure consisting of a -Al(R)O-(alkylaluminoxy) unit, or may be a mixture of both structures.

Thus, the alkylaluminoxane compound of the catalyst system is represented by any one of the following formulas (I), (II) and (III):

| | | |
|---|---|---|
| $R^1[Al(R^2)O]nAl(R^3,R^4)$ | (linear structure) | (I) |
| $[Al(R^5)O]m$ | (cyclic structure) | (II) |
| mixtures of (I) and (II) | | (III) | wherein $R^1$, $R^2$, $R^3$, $R^4$ and $R^5$ are selected from alkyls having from 1 to about 10 carbon atoms, n is an integer from 1 to about 100, and m is an integer from 2 to about 50. The mixtures (III) are preferable for alkylaluminoxane compound.

$R^1$, $R^2$, $R^{3\prime}$, $R^4$ and $R^5$ may be the same or different and are preferably alkyls having from 1 to 5 carbon atoms. Examples of alkyls include methyl, ethyl, propyl, butyl, isobutyl, pentyl and the like.

It is preferable that n is an integer from 10 to 30 and that m is an integer from 2 to 10.

Examples of the alkylaluminoxane compound are methylaluminoxane, ethylaluminoxane, propylaluminoxane, isobutylaluminoxane and the like.

The alkylaluminoxane compound can be prepared in accordance with any of a variety of preparation techniques. For example, the compound is prepared by reacting a trialkylaluminum in solution in the hydrocarbon solvent with water under mild conditions, and reacting also a cupric sulfate hydrate (Cu $SO_4, 5H_2$) with an aluminum compound.

When methylaluminoxane is prepared, the product obtained by reacting a trimethylaluminum with water (molar ratio 1.0) contains mixtures of linear polymer structure and cyclic polymer structure.

The copolymerization reaction is usually effected in the presence of an inert hydrocarbon solvent.

Examples of such solvents are aromatic hydrocarbons such as benzene, toluene, xylene, and the like; aliphatic hydrocarbons such as butane, pentane, hexane, heptane, octane, and the like; alicyclic hydrocarbons such as cyclohexane, and the like; and halogenated hydrocarbons such as methylenechloride, and the like.

The amount of the nickel compound is 0.001 to 10 mmole per 100 g of total monomers charged, and is preferably 0.01 to 1 mmole.

Further the molar ratio of aluminum in the alkylaluminoxane compound to nickel in the nickel compound is 1 to about $1 \times 10^5$, and is preferably 10 to about $1 \times 10^4$.

The relative amounts of butadiene and styrene employed in the copolymers of the invention can vary over a wide range. However, in general, the weight ratio of butadiene to styrene in the monomer charge is in the range of 95:5 to 5:95.

The polymerization process of the invention is effected at temperatures of $-50°$ C. to $200°$ C., with temperatures between $-20°$ C. and $100°$ C. being preferred.

The usual reaction time for the polymerization of the present invention can vary from 1 hour to 10 or more hours depending on the polymerization temperature, the solvent, the size of the polymerization reaction mixture, and all other conditions.

In the polymerization process of the present invention, a mixture of butadiene and styrene is contacted with a catalyst in the liquid phase, and the process is usually effected at pressures sufficient to maintain a liquid phase operation under an inert atmosphere.

All materials used in the polymerization system of this process should be essentially free from catalyst poisons.

The copolymerization reaction can be effected batchwise or in a continuous manner.

The catalyst used in the present invention has high polymerization activity, and in particular, high polymerization activity for comonomer styrene.

The copolymers produced by the process of the invention have cis-1,4 configuration of at least 80% of the butadiene units and bound styrene contents of 2 to 55%. These copolymers can be easily obtained by selecting catalyst components, catalyst components ratio, monomers ratio and the other polymerization conditions. In addition, the product is a true copolymer and not a mixture of butadiene-styrene copolymer and homopolystyrene.

The copolymers can be used in various applications in which natural rubber and synthetic rubber, e.g., SBR, have been employed heretofore such as in the manufacture of tires, tubing, belting, gaskets, hoses and the like.

The rubber-like copolymers can be compounded by any rubber compounding technology. Vulcanization agents, vulcanization accelerators, reinforcing agents and fillers, which are used in general-purpose rubbers, can similarly be used in compounding the copolymer of the present invention.

The present invention is described in more detail with reference to the following examples, which however should not be construed as limiting the scope of the present invention.

Unless specifically indicated otherwise, parts and percentages are given by weight. All reported percentages of "cis", "trans" and "vinyl" are based on the butadiene units of the copolymer.

EXAMPLES 1, 2 AND 3

19 ml of toluene, 0.1 mmole of nickel compound and 10 mmole of methylaluminoxane (produced by Tosoakzo Co.; 2.3 mole/l toluene solution) were charged in a 100 ml autoclave equipped with stirrer and maintained under a nitrogen atmosphere. After the mixture was stirred at room temperature for 10 minutes, a 20 g toluene mixture containing 4 g of 1,3-butadiene was introduced therein, followed by the addition of 7.8 g of styrene.

Polymerization was carried out at 30° C. for 1 hour while stirring. After polymerization, the polymer was precipitated and separated by adding the resultant polymer solution to a large amount of methanol containing a small amount of hydrochloric acid. Thereafter, the resultant polymer was dried in the usual manner.

Polymer conversion(%) per polymerization time (hour) was used as an index of the polymerization activity of the catalyst.

The polymerization results are shown in Table 1.

The homopolystyrene was determined as presented in K. Irako et al., "Bull. Chem. Soc. Japan", Vol. 41, p. 501 (1968).

The microstructure of the butadiene units was determined as presented in T. Ohtsu et al., *Preparative Methods of Polymer*, p. 43 (Kagaku Dojin, 1972).

The bound styrene was determined as presented in V. D. Mochel, "Rub. Chem. & Technol.", Vol. 40, p. 1200 (1967).

EXAMPLES 4, 5 AND 6

The procedure utilized in Example 1 was repeated in these experiments except that 0.2 mmole of acetylacetone nickel and 20 mmole of methylaluminoxane were added as a catalyst. In addition, 1,3-butadiene and styrene were added in the amounts indicated in Table 2, and polymerization was carried out at 50° C. for 1 hour. The polymerization results are shown in Table 2.

TABLE 1

| Experiment NO. | Ni-compound | Polymerization activity conversion (%)/ polym'n time (hr) | Homopolystyrene (g) | Bound styrene (%) | Microstructure of butadiene units (%) | | |
|---|---|---|---|---|---|---|---|
| | | | | | cis | trans | vinyl |
| Example 1 | Ni-acetylacetonate | 41 | 0.0 | 39 | 88 | 12 | 0 |
| Example 2 | Ni-formate | 50 | 0.0 | 39 | 86 | 14 | 0 |
| Example 3 | Ni-benzoate | 43 | 0.0 | 34 | 88 | 12 | 0 |
| Comp. Example | Ni-acetylacetonate | 5.1 | 0.5 | 34 | 75 | 20 | 5 |

TABLE 2

| Experiment NO. | Monomer (g) | | Polymerization activity conversion (%) polym'n time (hr) | Homopolystyrene (g) | Bound styrene (%) | Microstructure of butadiene units (%) | | |
|---|---|---|---|---|---|---|---|---|
| | | | | | | cis | trans | vinyl |
| Example 4 | Butadiene | 5.3 | 63 | 0.0 | 20 | 90 | 10 | 0 |
| | Styrene | 5.2 | | | | | | |
| Example 5 | Butadiene | 4.0 | 68 | 0.0 | 33 | 90 | 10 | 0 |
| | Styrene | 7.8 | | | | | | |
| Example 6 | Butadiene | 2.7 | 77 | 0.0 | 46 | 90 | 10 | 0 |
| | Styrene | 10.4 | | | | | | |

COMPARATIVE EXAMPLE

This experiment was conducted according to Kogyo Kagaku Zasshi, Vol. 72, p. 2081 (1969).

19 ml of toluene, 0.06 mmole of acetylacetone nickel and 0.75 mmole of titanium tetrachloride were charged in a 100 ml autoclave equipped with stirrer and maintained under a nitrogen atmosphere. After the mixture was stirred at room temperature for 10 minutes, 0.62 mmole of triethylaluminum was added therein. This mixture was then stirred for 10 hours, and thus the catalyst was prepared.

This experiment was carried out utilizing the same procedure described in Example 1, with the exception that the above-described catalyst was used.

The polymerization results are shown in Table 1.

From the comparison in Tables 1 and 2 of Examples 1 through 6 to the Comparative Example, it can be seen that, in the present invention, very high polymerization activity can be exhibited and that the copolymers obtained in accordance with the present invention are excellent in so far as they have a higher content of cis-1,4 configuration of the butadiene units and have no homopolystyrene.

What is claimed is:

1. A process for preparing a butadiene-styrene copolymer which comprises polymerizing a butadiene monomer and styrene monomer in the presence of a catalyst, wherein said catalyst comprises:

(A) a nickel compound, wherein said nickel compound is selected from the group consisting of a nickel salt of an organic carboxylic acid and an organic complex compound of nickel, wherein said nickel salt of an organic carboxylic acid is represented by the following formula:

$(R^6-CO-O)_p Ni$ wherein $R^6$ is selected from the group consisting of an aliphatic-hydrocarbon, an alicyclic-hydrocarbon and an aromatic-hydrocarbon and p is the valence of nickel, and (B) an alkylaluminoxane compound, wherein said alkylaluminoxane compound is a compound represented by formulas (I) or (II), or a mixture thereof:

$$R^1(Al(R^2)O)_n Al(R^3, R^4) \quad (I)$$

$$(Al(R^5)O)_m \quad (II)$$

wherein $R^1$, $R^2$, $R^3$, $R^4$ and $R^5$ are each an alkyl having from 1 to about 10 carbon atoms, n is an integer from 1 to about 100, and m is an integer from 2 to about 50, and wherein formula (I) represents a linear structure and formula (II) represents a cyclic structure, and wherein said nickel compound is present in an amount of 0.001 to 10 mmole per 100 g of the combined amount of said butadiene monomer and said styrene monomer, and a molar ratio of aluminum in said alkylaluminoxane compound to nickel in said nickel compound is 1 to about $1 \times 10^5$.

2. The process as specified in claim 1 wherein said organic complex of nickel is selected from the group consisting of a carbonyl nickel complex, a hydroxyaldehyde nickel complex, a hydroxyketone nickel complex, a hydroxyester nickel complex, a diketonedioximo nickel complex, an 8-hydroxyquinoline nickel complex and a $\pi$-cyclopentadienyl nickel complex.

3. The process as specified in claim 1 wherein said nickel compound is nickel formate.

4. The process as specified in claim 1 wherein said nickel compound is nickel benzoate.

5. The process as specified in claim 1 wherein said nickel compound is acetylacetone nickel.

6. The process as specified in claim 1 wherein said alkylaluminoxane compound is prepared by reacting a trialkylaluminum with water.

7. The process as specified in claim 1 wherein said alkylaluminoxane compound is methylaluminoxane.

8. The process as specified in claim 1 wherein said alkylaluminoxane is ethylaluminoxane, propylaluminoxane or isobutylaluminoxane.

9. The process as specified in claim 1 wherein said nickel compound is nickel formate and said alkylaluminoxane compound is methylaluminoxane.

10. The process as specified in claim 1 wherein said nickel compound is nickel benzoate and said alkylaluminoxane compound is methylaluminoxane.

11. The process as specified in claim 1 wherein said nickel compound is acetylacetone nickel and said alkylaluminoxane compound is methylaluminoxane.

* * * * *